United States Patent [19]

Yonekubo

[11] 4,241,251
[45] Dec. 23, 1980

[54] PHOTOELECTRIC SWITCHING MEANS FOR MICROSCOPE ILLUMINATION SYSTEM

[75] Inventor: Ken Yonekubo, Hachiouji, Japan

[73] Assignee: Olympus Optical Co., Ltd., Tokyo, Japan

[21] Appl. No.: 954,591

[22] Filed: Oct. 25, 1978

[30] Foreign Application Priority Data

Oct. 29, 1977 [JP] Japan .................................. 52-130070

[51] Int. Cl.³ ............................................. G02B 21/08
[52] U.S. Cl. ..................................... 250/205; 350/87
[58] Field of Search .................. 250/201, 205, 214 P, 250/215; 350/87

[56] References Cited

FOREIGN PATENT DOCUMENTS 2219521  4/1972  Fed. Rep. of Germany .

*Primary Examiner*—David C. Nelms
*Assistant Examiner*—Darwin R. Hostetter
*Attorney, Agent, or Firm*—Cushman, Darby & Cushman

[57] ABSTRACT

An automatic switching means for microscope illumination system comprising objective lenses having screws which are used for attaching said objective lenses to a revolver and have different lengths depending on magnification levels of the objective lenses and detecting means for detecting the differences of said screws, and being so adapted as to switch an illumination system for a different illuminating condition on the basis of detected length of the screw. Said automatic switching means is so adapted as to assure favorable illuminating condition regardless of setting positions of said objective lenses in the revolver.

6 Claims, 4 Drawing Figures ically set up an illuminating condition optimum for the magnification level of an objective lens to be used for microscopy when objective lenses are switched from one to another having a different magnification level.

PHOTOELECTRIC SWITCHING MEANS FOR MICROSCOPE ILLUMINATION SYSTEM

BACKGROUND OF THE INVENTION (a) Field of the Invention

The present invention relates to an automatic switching means for microscope illumination system which functions to automatically set up an illuminating condition optimum for the magnification level of an objective lens to be used for microscopy when objective lenses are switched from one to another having a different magnification level.

(b) Description of the Prior Art

It is generally necessary to switch an illumination system to another assuring an illuminating condition matched with an objective lens to be used for microscopy when objective lenses are switched from one to another having different magnification level in a microscope. For this purpose, an illumination system for microscopes usually comprises plural number of different condenser lenses which are to be selected for use in conjunction with switching of objective lenses, and a removably arranged auxiliary lens which is to be inserted and removed into and from the optical path of the illumination system, thereby setting up an illuminating condition optimum for an objective lens to be used for microscopy.

In case of an illumination system for microscopes which is so adapted as to set up an illuminating condition optimum for an objective lens to be used for microscopy when objective lenses are switched as described above in a microscope, it is very convenient to devise the illumination system so as to be automatically switched in conjunction with switching of the objective lenses in the microscope, and there have already known microscopes equipped with illumination systems which are automatically switchable as described above. A first type of such automatic switching means comprises a means for detecting an objective lens used in the revolver of a microscope and is so devised as to detect what objective lens is selected for microscopy to determine position of the revolver on the basis of the signal detected by said detecting means, thereby switching the illumination system. A second type of automatic switching means for microscope illumination system is equipped with an interlocking mechanism which automatically switches an illumination system in conjunction with switching of the revolver of a microscope. Further, there is known another automatic switching means, of a type similar to said first type, which comprises signal members arranged on the sides of the revolver and is so devised as to automatically switch an illumination system on the basis of signals obtained with the signal members.

Since all of these automatic switching means are so designed as to detect magnification levels of objective lenses in conjunction with rotation of the revolver, it is essential that correct correspondence is established between objective lenses and tapped holes formed in the revolver for setting the objective lenses. In other words, such switching means require setting objective lenses correctly in the corresponding holes, thereby making setting works rather tedious. Should the objective lenses be set in wrong holes, it may be impossible to set up illuminating condition optimum for an objective lens system to be used for microscopy.

SUMMARY OF THE INVENTION

A general object of the present invention is to provide an automatic switching means for microscope illumination system which comprises signal members arranged on the screws of the objective lenses and detecting members for detecting signals from said signal members, and is to adapted as to set up illuminating condition optimum for an objective lens to be used for microscopy on the basis of a signal detected with said detecting members.

DESCRIPTION OF THE PREFERRED EMBODIMENTS

Now, the automatic switching means for microscope illumination system according to the present invention will be described detailedly referring to the embodiments shown in the accompanying drawings.

Figure 1:
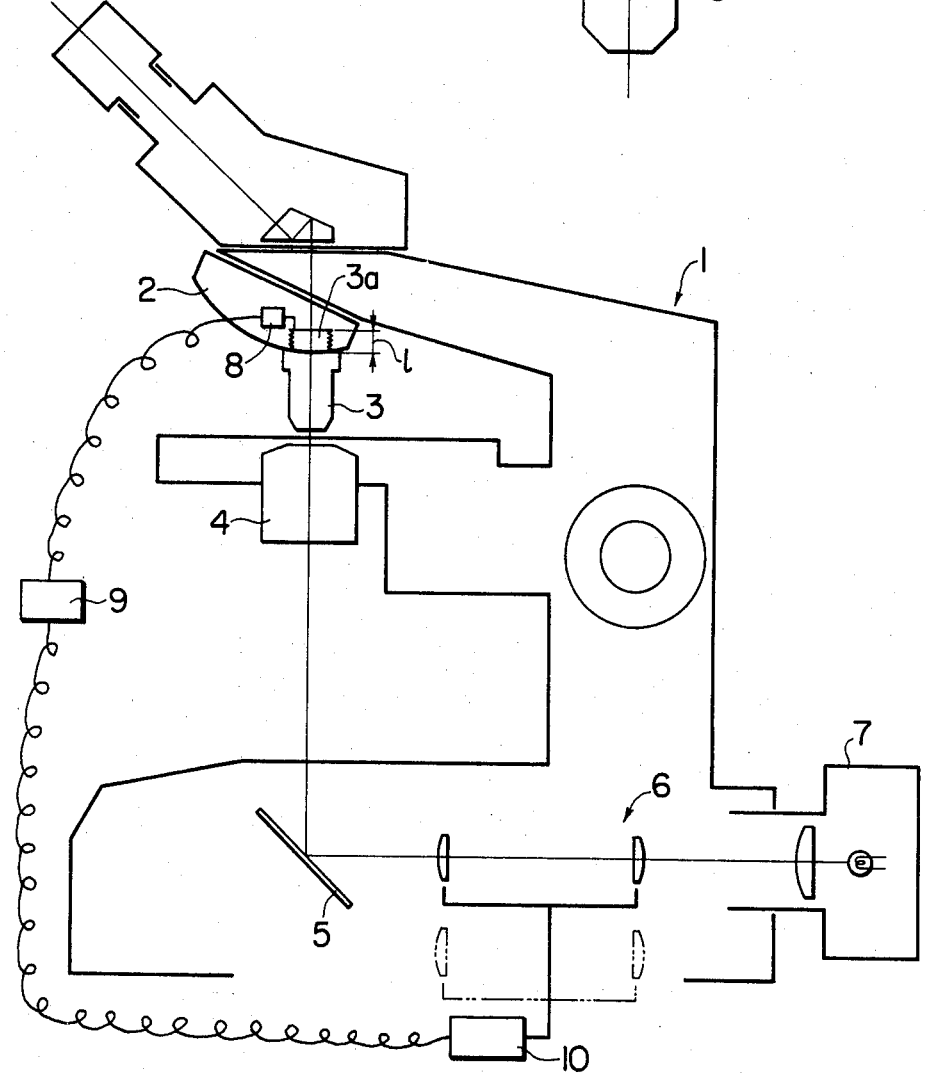
FIG. 1 shows a sectional view illustrating the composition of a first embodiment of the automatic switching means for microscope illumination system according to the present invention.

In the Embodiment 1 shown in FIG. 1, the reference numeral 1 represents a microscope, the reference numeral 2 designates a revolver, the reference numeral 3 denotes an objective lens, the reference numeral 4 represents a condenser lens, the reference numeral 5 designates a reflecting mirror, the reference numeral 6 denotes auxiliary lenses which are so arranged as to be switched between the positions indicated by the solid lines and chain lines respectively, the reference numeral 7 represents a light source, the reference numeral 8 designates microswitches arranged in said revolver, the reference numeral 9 denotes a controller which controls insertion and removal of the auxiliay lenses, etc. and the reference numeral 10 represents a driving unit for inserting and removing said auxiliary lens into and from the optical path of the illumination system. Though only a single objective lens is shown in this figure, the revolver is actually equipped with plural objective lenses having different magnification levels. The length of the portion as measured from the flange of the objective lens 3 on the image side i.e., length 1 of the screw 3a for attaching an objective lens to a revolver is made different depending on magnification level of the objective lens. The microswitches 8 are arranged in plural numbers at adequate positions in the revolver so that they are not turned with rotation of the revolver and can detect the respective screws 3a having different lengths corresponding to magnification levels of the objective lenses. Therefore, the automatic switching means is so adapted as to automatically set up illuminating conditions matched with the respective objective lenses by detecting an objective lens placed in the optical path with a corresponding microswitch and inserting or removing the auxiliary lenses 6 into or from the optical path by operating the controller and driving unit on the basis of the detector signal.

In a case where the illumination system is designed for switching between two ranges for high and low magnification levels, or three ranges of high, medium and low magnification levels, it is unnecessary to select different screw lengths for all the magnification levels, but it will be sufficient to select different screw lengths for the respective magnification ranges. When the illumination system is to be switched between two magnification ranges, for example, it will be sufficient to group the screws into longer and shorter ones which can be distinguished by ON and OFF operation of a single microswitch.

Figure 2:
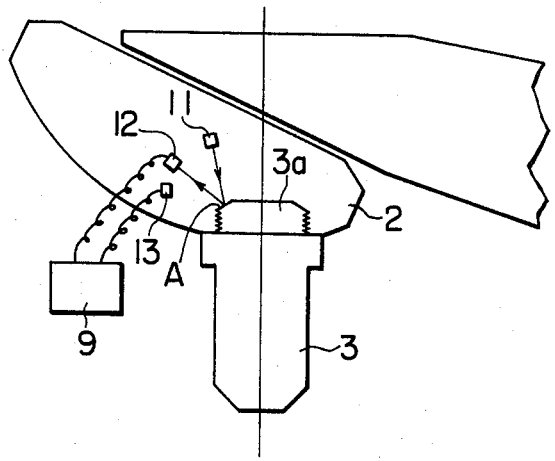
FIG. 2 shows a sectional view illustrating the composition of a second embodiment of the present invention.

FIG. 2 shows the composition of the Embodiment 2, illustrating only the vicinity of the revolver since the rest portion remains the same as that shown in FIG. 1. In this embodiment, screws 3a of the objective lenses 3 are chamfered to form tapered surfaces indicated by the reference symbols A on the circumference thereof. These tapered surfaces are at different angles depending on magnification levels of the objective lenses to be used in combination. The reference symbols 11 represents a light emitting element such as a light emitting diode and the reference symbols 12, 13, . . . designate light receiving elements which are arranged in plural numbers at different positions. Describing more concretely, light emitted from the light emitting element 11 is reflected by one of the tapered surfaces A formed on the screw 3a of the objective lens 3 and then is detected with one of the light receiving elements 12, 13, . . . By arranging these light receiving elements at such positions as to receive the reflection lights from the said tapered surface having different angles respectively, it is possible to detect a type (magnification level) of an objective lens selected for microscopy depending on the position of the light receiving element which has detected the light, and automatically set up illuminating condition on the basis of the detecting signal.

Figure 3:
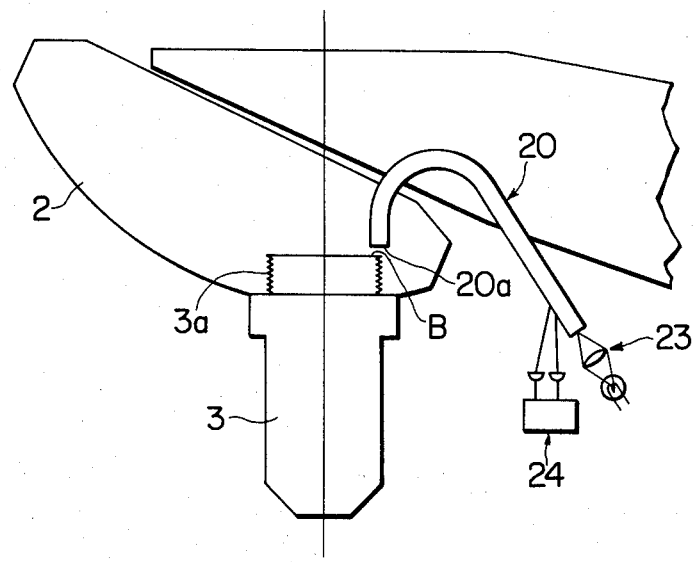
FIG. 3 shows a sectional view illustrating the composition of a third embodiment of the present invention.
Figure 4:
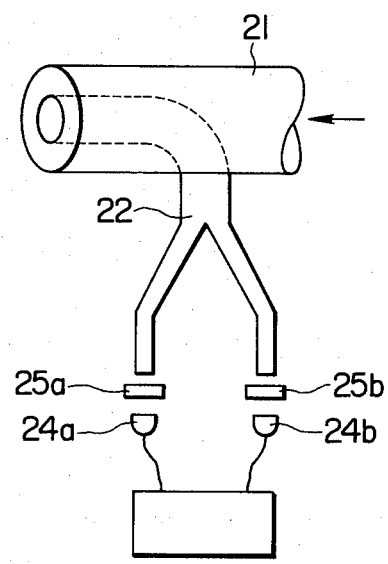
FIG. 4 shows a diagram illustrating a portion of the third embodiment detailedly on a larger scale.

FIG. 3 shows the Embodiment 3 of the present invention in which the end surface indicated by the reference symbol B of the screw 3a of the objective lenses is marked in different colors in correspondence to magnification levels of the objective lenses. A bundle of optical fibers 20 is arranged with its one end 20a opposite to the end surface B of the screw of the objective lenses so that the light from the light source 23 is led to the end surface B and the light reflected on said surface is led toward a light receiving element 24. That is to say, as shown detailedly in FIG. 4, the bundle of of optical fibers consists of a portion 21 which serves for leading the light from the light source and another portion 22 which serves for leading the light reflected by the end surface of the screw of the objective lenses to the light receiving element 24, said bundle of optical fibers 22 being further divided, at the end located on the side of the light receiving elements, into plural bundles for which light receiving elements 24a, 24b, . . . are arranged with filters 25a, 25b . . . interposed therebetween. Used as the filters 25a, 25b, . . . are those each having such a transmission wavelength band as to permit transmitting light of any one of the colors marked on the end surfaces of the screws of the objective lenses. In this embodiment, the light beam from the light source is reflected on the end surface B for leading toward the light receiving elements, however, the light is detected only with the light receiving element which is combined with the filter allowing to pass the reflected light, thereby making it possible to automatically switch an illumination system so as to set up illuminating condition matched with the magnification level of the objective lens to be used for microscopy in the manner similar to those described with reference to the Embodiments 1 and 2.

In the foregoing descriptions, though the angles of the tapered surfaces and the signal members such as color marks provided on the end surface of the screw, etc. may be in the number same as that of the objective lenses having different magnification levels, it is possible to select the number of such discrimination signals in the number of magnification ranges, for example, two for a low magnification range (4× and 10×) and a high magnification range (20× and 40×), or three for low (4×), medium (10× and 20×) and high (40× and 100×) magnification ranges. However, such discrimination signals may be different for all the different magnification levels at the detection stage and used the subsequent control stage for setting the illumination system in an illuminating condition matched with a magnification range. In the latter case, the switching means for illumination system permits detecting magnification level of the objective lens selected for microscopy and, therefore, it is possible to equip a mechanism for legibly indicating the magnification level for the microscopist.

As is clearly understood from the above descriptions, the switching means for microscope illumination system according to the present invention comprises signal members for respective objective lenses and is so adapted as to automatically switch illuminating conditions in the illumination system on the basis of the signals from said signal members. The switching means therefore assures an illuminating condition matched with the magnification level of the objective lens selected for microscopy when objective lenses are switched from one to another by rotating the revolver, and further eliminates the necessity to confirm set positions of the respective objective lenses at the stage to set said objective lenses in the revolver.

I claim:

1. For a microscope which has a microscope body including a revolver having a plurality of objective lenses mounted thereon for alternative use, by having an objective screw means of each such objective lens received in a respective socket means in the revolver, and by providing for movement of said revolver so as to make it possible to move each objective lens alternatively to the same site, which microscope has a specimen-illuminating system, including means for changing illumination conditions to at least two levels;
    an automatic switching means, comprising:
    each of said objective screw means having a signal means provided thereon, at least one of said signal means providing a signal which is detectably different from that provided by at least another of said signal means, which signals all correspond with the magnification power obtainable through use of the respective objective lenses;
    detecting means having signal receiving means arranged within said microscope body for detecting the said signal being emitted by the particular one of said objective lenses which happens to be at the said site;
    a driving means for changing said illuminating conditions to said at least two levels;
    and a control means operably interposed between said detecting means and said driving means, for controlling said driving means to change said illuminating conditions on the basis of detection of which signal is being emitted at said site by the respective said signal means.

2. An automatic switching means for a microscope illumination system according to claim 1, wherein:

said objective screw means are of at least two differing lengths, the lengths of said objective lens screw means corresponding with the magnification power obtainable through use of the respective objective lenses and thereby providing said signal means.

3. An automatic switching means for microscope illumination system according to claim 1 wherein said signal members are tapered surfaces at different angles formed on the circumferences of the screw means of the objective lenses.

4. An automatic switching means for microscope illumination system according to claim 1 wherein said signal members are different color marks formed on the end surfaces of the screw means of the objective lenses.

5. An automatic switching means for microscope illumination system according to claim 4 which additionally comprises a light source, a bundle of optical fibers for leading the light from said light source to said end surfaces of the screw means of the objective lenses and another bundle of optical fibers for leading the light which is led through said bundle of optical fibers and reflected by the end surfaces of the screw means of the objective lenses.

6. An automatic switching means for microscope illumination system according to claim 3 wherein said detector means consists of a light source arranged in the vicinity of said tapered surfaces and plural light receiving elements, and which is so adapted in such a manner that any one of said light receiving elements detects the light emitted from the light source and reflected by one of said tapered surfaces.

* * * * *